United States Patent
Edwards (10) Patent No.: US 10,638,671 B2
(45) Date of Patent: May 5, 2020

(54) ADHESIVE MEMBRANE USED TO PRESERVE THE FRESH CUT CHARACTERISTICS OF A CHRISTMAS TREE BASE

(71) Applicant: James Scott Edwards, Newtown, CT (US)

(72) Inventor: James Scott Edwards, Newtown, CT (US)

(73) Assignee: FRESH CUT TECH LLC, Botsford, CT (US)

( * ) Notice: Subject to any disclaimer, the term of this patent is extended or adjusted under 35 U.S.C. 154(b) by 327 days.

(21) Appl. No.: 15/475,822

(22) Filed: Mar. 31, 2017

(65) Prior Publication Data

US 2017/0280638 A1 Oct. 5, 2017

Related U.S. Application Data (60) Provisional application No. 62/347,820, filed on Jun. 9, 2016, provisional application No. 62/318,504, filed on Apr. 5, 2016.

(51) Int. Cl.
*A01G 13/00* (2006.01)
*A01G 13/02* (2006.01)
(Continued)

(52) U.S. Cl.
CPC ........... *A01G 13/0237* (2013.01); *A01G 5/00* (2013.01); *A01G 5/06* (2013.01); *A01G 7/00* (2013.01);
(Continued)

(58) Field of Classification Search
CPC ...... A01G 13/0237; A01G 7/06; A01G 24/35; A01G 23/04; A01G 5/06; A01G 7/08;
(Continued)

(56) References Cited

U.S. PATENT DOCUMENTS

| | | | |
|---|---|---|---|
| 4,264,088 A * | 4/1981 | Replogle | A63C 9/081 280/618 |
| 4,897,297 A | 1/1990 | Zafiroglu | |
| 5,142,817 A | 9/1992 | Rolf | |
| 5,224,967 A | 7/1993 | Rolf et al. | |
| 5,525,130 A | 6/1996 | Beaudry | |
| 5,656,282 A * | 8/1997 | Cook | A01N 25/18 424/408 |

(Continued)

FOREIGN PATENT DOCUMENTS

| | | |
|---|---|---|
| CN | 101507435 A | 8/2009 |
| WO | 2008114953 A1 | 9/2008 |
| WO | 2014074992 A2 | 5/2014 |

OTHER PUBLICATIONS

"Tree Moist JCD-024TMP Plus 2-Ounce Bag", http://www.amazon.com/TreeMoistJCD024TMPPlus2Ounce/dp/B0043BH6KY; 4 pages, retrieved on May 23, 2016.

*Primary Examiner* — Kathleen I Alker
*Assistant Examiner* — Steven J Shur
(74) *Attorney, Agent, or Firm* — Dilworth IP, LLC (57) ABSTRACT

A membrane for covering the cut end of a tree trunk to prevent the tree from creating a seal after it has been cut. The membrane is attachable to the cut end surface of the tree trunk and includes a hydrating layer comprising a hydrogel. The hydrogel, made up primarily of water, adheres to the cut end surface of the tree trunk to continue hydrating the tree, and prevents air from reaching the tree's exposed transport tissue. In some embodiments, the membrane includes a backing layer and a release layer on opposite sides of the hydrating layer.

21 Claims, 7 Drawing Sheets

(51) Int. Cl.

| | | |
|---|---|---|
| *A01G 7/00* | (2006.01) | |
| *A01G 7/06* | (2006.01) | |
| *A01G 5/00* | (2006.01) | |
| *A01G 5/06* | (2006.01) | |
| *A01G 23/00* | (2006.01) | |
| *A01G 23/02* | (2006.01) | |
| *A01G 23/04* | (2006.01) | |
| *A01G 24/35* | (2018.01) | |
| *A47G 33/04* | (2006.01) | |
| *A01G 24/00* | (2018.01) | |

(52) U.S. Cl.
CPC ............... *A01G 7/06* (2013.01); *A01G 13/00* (2013.01); *A01G 13/02* (2013.01); *A01G 23/00* (2013.01); *A01G 23/02* (2013.01); *A01G 23/04* (2013.01); *A01G 24/00* (2018.02); *A01G 24/35* (2018.02); *A47G 33/04* (2013.01); *A47G 33/045* (2013.01)

(58) Field of Classification Search
CPC .... A01G 7/085; A47G 33/045; B65D 85/505; A61F 15/001
USPC .................................................. 47/32.5, 72
See application file for complete search history.

(56) References Cited

U.S. PATENT DOCUMENTS

| | | | |
|---|---|---|---|
| 5,866,141 A | 2/1999 | Tojo et al. | |
| 6,032,409 A * | 3/2000 | Obonai | A01H 4/001 |
| | | | 47/44 |
| 6,131,735 A * | 10/2000 | Holtkamp, Jr. | B65D 85/52 |
| | | | 206/423 |
| 6,610,381 B1 | 8/2003 | Conway | |
| 8,250,805 B2 * | 8/2012 | Jaiswal | A01G 5/06 |
| | | | 47/41.01 |
| 8,316,581 B2 | 11/2012 | Rubin | |
| 8,667,733 B2 * | 3/2014 | Beck | A01G 24/00 |
| | | | 47/40.5 |
| 2004/0016179 A1 * | 1/2004 | Moran | A01G 27/06 |
| | | | 47/79 |
| 2004/0237387 A1 | 12/2004 | McCamy | |
| 2005/0118383 A1 | 6/2005 | Cargill et al. | |
| 2006/0117656 A1 * | 6/2006 | Graham | A01G 27/00 |
| | | | 47/65.8 |
| 2006/0201063 A1 | 9/2006 | Huon | |
| 2008/0282611 A1 * | 11/2008 | Graham | C08G 18/4833 |
| | | | 47/84 |
| 2012/0023817 A1 * | 2/2012 | Charrin | A01G 5/04 |
| | | | 47/41.13 |

* cited by examiner

ADHESIVE MEMBRANE USED TO PRESERVE THE FRESH CUT CHARACTERISTICS OF A CHRISTMAS TREE BASE

FIELD OF THE INVENTION

The invention relates to preserving and maintaining trees, and more specifically to an apparatus and method for preserving the fresh cut characteristics of a tree base.

BACKGROUND OF THE INVENTION

Trees absorb water through their roots and pass the water up the tree via transport tissue. In particular, xylem tissue, which forms part of the tree's trunk and may include tracheids, vessels, parenchyma cells, and woody fibers, transports water up the trunk and throughout the tree.

When a tree is cut down, the xylem tissues tend to close up rapidly. The tree compartmentalizes and forms a seal on the cut surface after exposure to air. This creates a problem, particularly with Christmas trees, when any measurable time passes between cutting and placing the tree in a stand with water. By the time the cut tree is exposed to water again, its ability to draw up the water is limited or entirely prevented.

The solution to this problem has historically been to make a fresh cut on the tree immediately before putting it into the tree stand. However, many consumers do not want to go through the trouble of re-cutting the tree and may not have the tools to do so. Thus, the lifespan of Christmas trees is often limited when a second cut is not done.

SUMMARY OF THE INVENTION

An object of the present invention is to provide an improved solution to the problem of tree trunks sealing up after cutting that does not require re-cutting the tree base. A further object is to provide such a solution that also maintains hydration in the tree during and after transport, and also in the tree stand.

These and other objects are achieved by providing a membrane attachable to a cut end surface of a tree trunk. The membrane includes a hydrated layer (e.g., hydrogel) with a high water content. The hydrogel layer preferably has adhesive qualities to attach to the cut end surface. However, in some embodiments, the membrane may include an adhesive layer adjacent to the hydrogel layer to aid in attachment to the tree. The membrane may also include a backing layer and a removable release layer on opposite sides of the hydrated layer.

The hydrogel layer has 80% or more water content, and preferably 90% or more water content. In an even more preferred embodiment the hydrogel layer has 95% or more water content. The hydrogel may be electron beam cured and/or radiation cured.

Further provided is a method of preserving a cut tree including the steps of cutting a tree down via a trunk of the tree, installing (e.g., immediately or soon thereafter) a membrane according to the present invention to a cut end of the trunk, inserting the tree into a tree stand, and filling the stand with water. In some embodiments, the tree is inserted into the stand with the membrane and a backing layer. In some embodiments, the method includes the step of removing the backing layer to allow water to more easily pass to the hydrating layer and/or removing the membrane. In some embodiments, the membrane is circular having a distal edge about a circumference of the membrane, wherein the step of installing the membrane includes adhering a central portion of the membrane to the cut end of trunk and adhering the distal edge to sides of the trunk.

DETAILED DESCRIPTION OF THE INVENTION

Figure 1A:
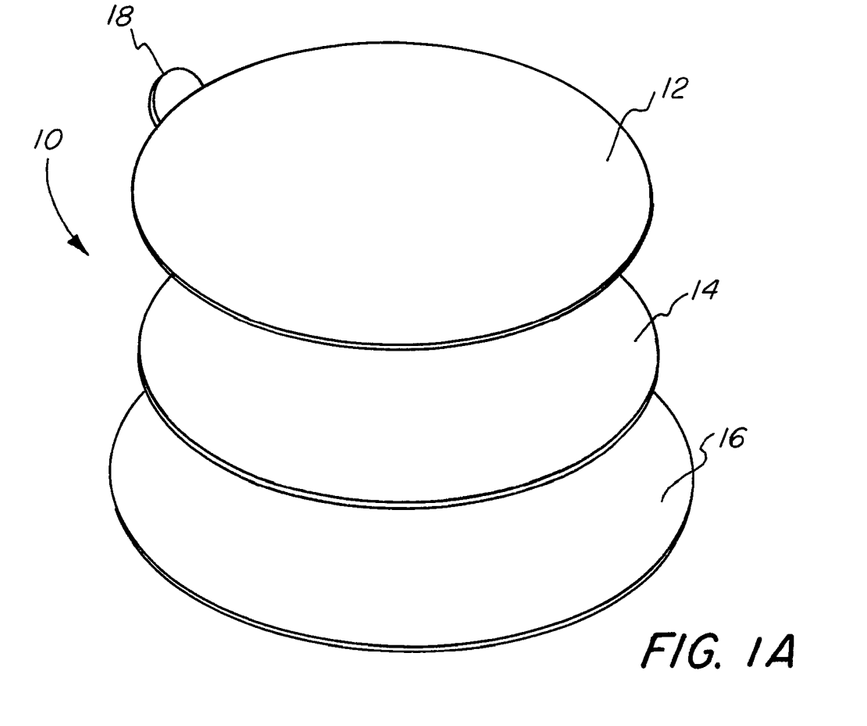
FIGS. 1A-1B illustrate a membrane according to an exemplary embodiment of the present invention.
Figure 1B:
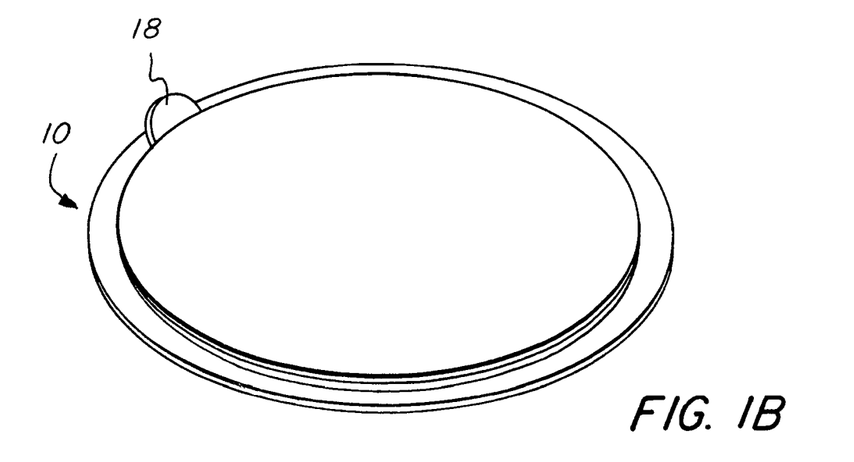

FIGS. 1A-1B illustrate a membrane 10 according to an exemplary embodiment of the present invention. FIG. 1A is an exploded view showing the various layers of the membrane 10. In the exemplary embodiment, each of the layers are circular.

The membrane 10 may include a backing layer 12. The backing layer 12 may, for example, be made of a poly material such as a polyethylene film (e.g., a 9.8 Mil matte polyethylene acetate film). In one embodiment, the backing layer 12 is Mylar. The backing layer 12 may be impermeable to air and/or permeable to water. In some embodiments, the backing layer 12 (and/or the release layer 16) includes a tab 18 to facilitate removal. In some embodiments, no backing layer 12 is used.

The membrane 10 further includes a hydrated layer 14. In the exemplary embodiment, the hydrated layer 14 is a hydrogel which absorbs water. In some embodiments, the hydrated layer 14 has a thickness of at least 20 Mil or at least 30 Mil, such as 32 Mil. The hydrated layer 14 includes a water content of at least 80% and preferably 90% or more (e.g., 94%).

In one embodiment, the hydrated layer 104 is formed from a hydrogel including polyethylene oxide (e.g., a 4% polyethylene oxide hydrogel) that is mixed as a liquid slurry, extruded to create a sheet, and then cross-linked to at least partially solidify the sheet using electron beam curing. In some embodiments, the hydrated layer 14 is a radiation cured hydrogel. Embodiments with at least 90% or more of water content, such as hydrogels created by electron beam curing, were found to last up to 72 hours or more and sufficiently prevent sealing of tree. Hydrated layers 14 with less than 80% or even less than 90% may not diffuse water into the tree at a fast enough rate and/or in a sufficient amount.

In some embodiments, the hydrated layer 14 has sufficient cross-linking to avoid the hydrogel from being absorbed and/or passed into the tree during use. This is advantageous because applicant has discovered that absorbing hydrogel into the tree trunk can act to seal the tree trunk and/or reduce the amount of water absorption. A woven material may also be used as the foundation to the hydrogel layer, to help resist tearing.

The membrane 10 further includes a release layer 16 that is adjacent to the hydrated layer 14 before use and removed immediately prior to use. The release layer 16 may be, for example, a Mylar liner or any other suitable material to releasably attach to the hydrated layer 14 such as a 3 Mil thick Mylar liner. The hydrogel has adhesive qualities which provide enough stickiness to hold the membrane 10 to the cut portion of the tree trunk and/or the adjacent bark. In some embodiments, the hydrated layer 14 may have an additional adhesive layer or adhesive application provided to aid in attaching the membrane 10 to a tree trunk.

Figure 2:
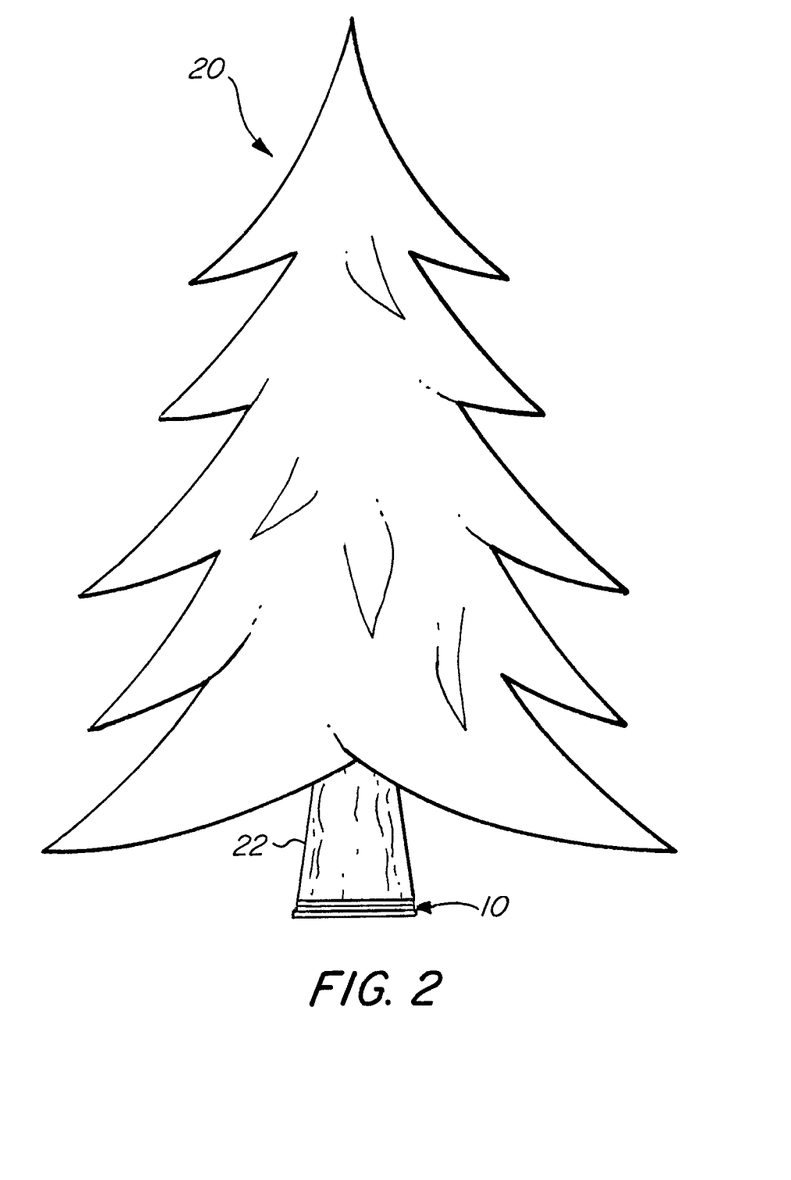
FIG. 2 is a side view of a tree including a membrane according to an exemplary embodiment of the present invention.
Figure 3:
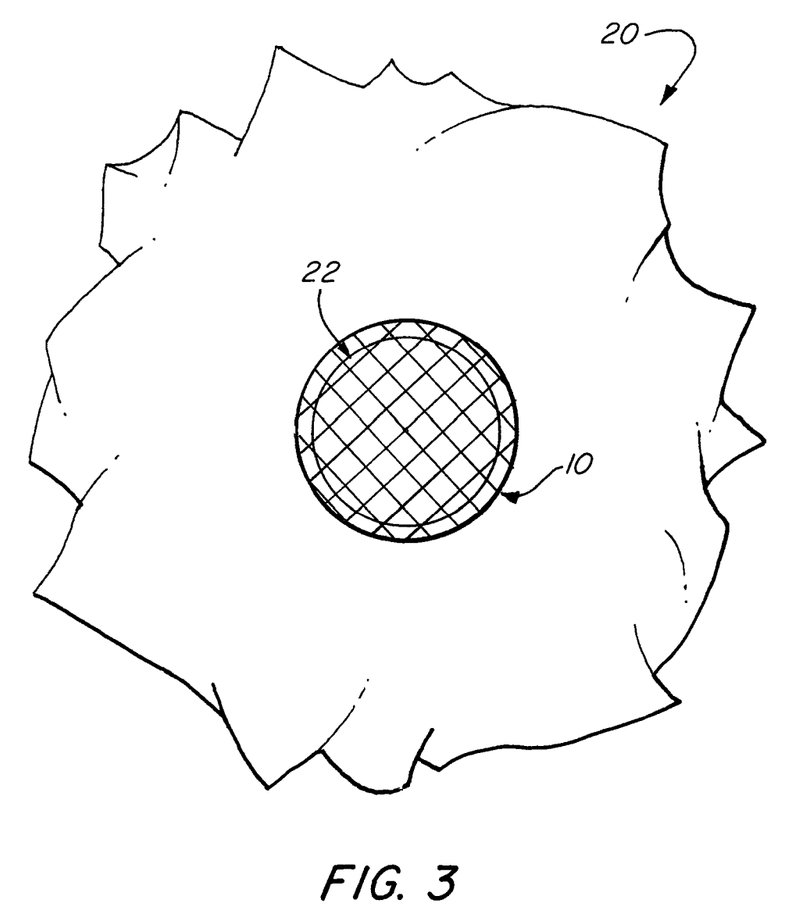
FIG. 3 is a bottom view of the tree shown in FIG. 2.

FIGS. 2-3 illustrate a tree 20 with a membrane 10 attached thereto. The tree 20 (e.g., a Christmas tree) is first cut down at tree farm or other location. A user then removes the release layer 16 and applies the membrane 10 by sticking the membrane 10 to the base of the tree trunk. The membrane 10 generally covers the entirety of the cut surface of the tree 20.

Figure 4:
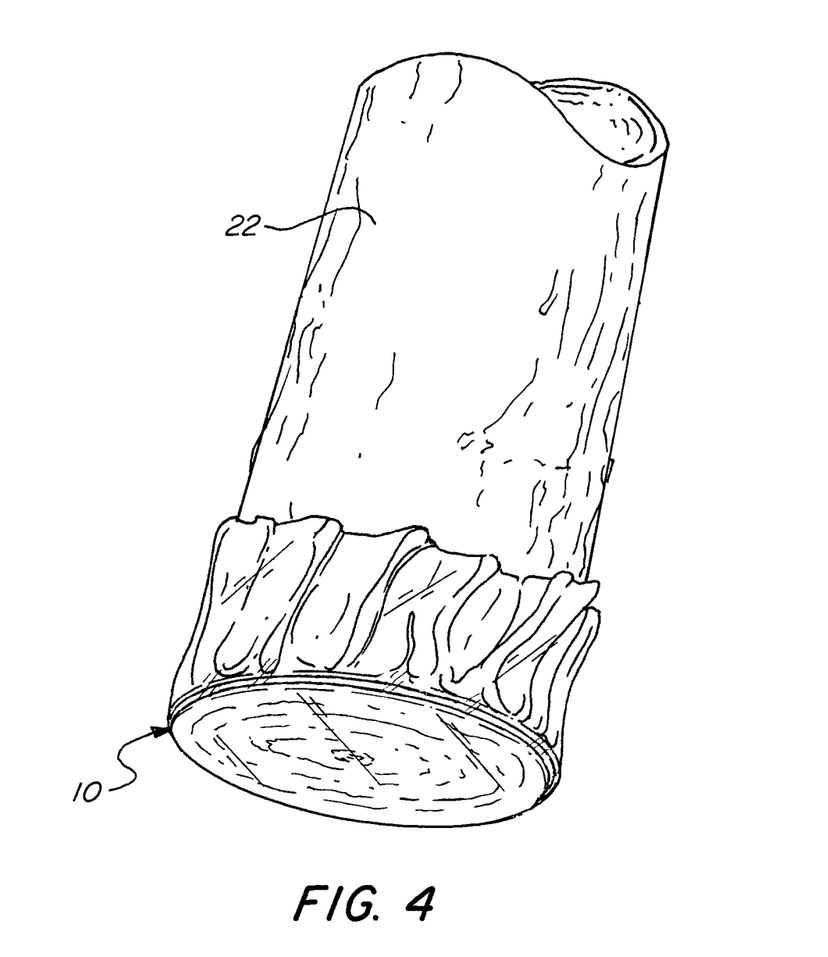
FIG. 4 illustrates a membrane according to an exemplary embodiment of the present invention on a tree.

The membrane 10 may also be wrapped around and onto the sides of the trunk as shown in FIG. 4. This may aid in securing the membrane 10 to the tree 20, and also ensure that the entirety of the cut surface is covered. Thus, the diameter of the membrane 10 may be equal to the diameter of the tree trunk, or greater (e.g., 1-3 inches greater than an average Christmas tree trunk) as shown in FIG. 4. For example, the membrane 10 may be offered in one or more standard sizes, such as a 6-inch diameter membrane and/or a 10-inch diameter membrane. Applying the membrane 10 prevents the tree base from naturally forming a seal (either a full seal preventing water uptake or a partial reducing water uptake) during transport.

Figure 5:
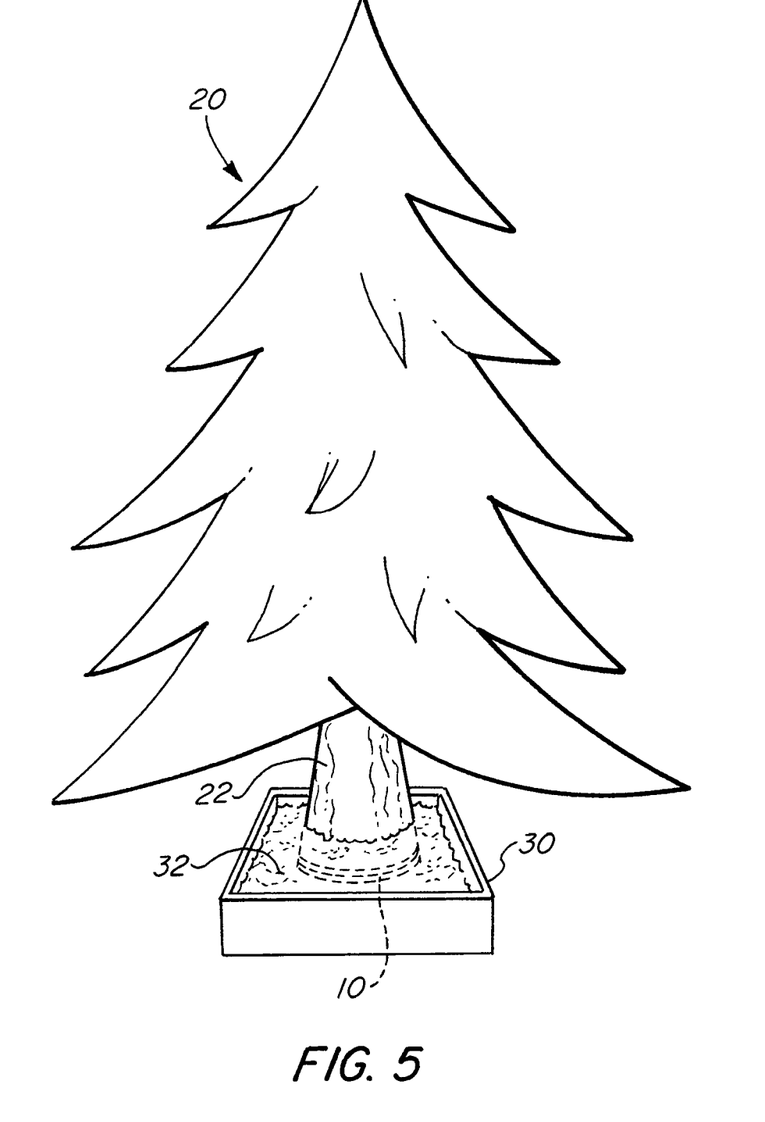
FIG. 5 is a side view of a tree including a membrane according to an exemplary embodiment of the present invention mounted in a tree stand.

FIG. 5 shows the tree 20 mounted in a tree stand 30 with water 32. When the tree 20 is placed in the tree stand 30, the membrane 10 may be removed. Having been treated with the membrane 10 during transport, a seal does not form and the tree 20 is able to take up water which it would not have been able to fully do had the tree 20 formed a seal.

In some embodiments, the membrane 10 can also remain on the tree 20. This eliminates the need for the user to remove the membrane 10. Also, the membrane 10 may continuously retain a deposit of water as a reserve in the event that the tree stand 30 dries out. Depending on the permeability of the backing layer 12 material, water may pass through the backing layer 10 or around the edges of the backing layer 12 to the membrane 10. In some embodiments, the backing layer 12 is eliminated to allow water 32 to more easily diffuse through the hydrated layer 14.

In embodiments of the membrane 10 employing a release layer 16, the user removes the release layer 16 to expose the hydrating layer 14 and applies the hydrating layer 14 directly to the cut surface of the tree trunk 22. The hydrogel of the hydrating layer 14 may provide sufficient adhesiveness to adhere to the tree trunk 22. Alternatively, the hydrating layer 14 may include an additional adhesive or an adhesive layer. In some embodiments, the hydrating layer 14 is impermeable to air. The backing layer 12 may be impermeable to air and/or permeable to water. In some embodiments, the backing layer 12 is impermeable to both air and water.

In embodiments, the hydrating layer 14 and backing layer 12 can be left on the tree trunk 22 when it is placed in the tree stand 30 and water 32 is added. The hydrating layer 14 continues to provide water to the tree trunk 22 while absorbing and diffusing more water from the water 32. This allows the user the convenience of not having to remove the membrane 10 before installing the tree 20 into the stand 30. In embodiments where neither the hydrating layer 14 nor the backing layer 12 are permeable to water, both should be removed before installing the tree 20 into the stand 30. In embodiments where only the hydrating layer 14 is permeable to water and the backing layer 12 is impermeable to water, the backing layer 12 should be removed before installing the tree 20 into the stand 30. In some embodiments, tab 18 is provided to assist removing the backing layer 12.

A preferable embodiment of the membrane 10 employs a release layer 16, an air and water permeable hydrating layer 14, and an air and water impermeable backing layer 12. To use this embodiment, the user removes the release layer 16, preferably using a tab 18, and applies the hydrating layer 14 to the cut end of the trunk 22 of the tree 20, preferably immediately or shortly after the tree 20 was cut down. The user can then transport the tree 20 to the location he or she wishes to display it, and the air impermeable backing layer 12 prevents air from reaching the cut end of the tree trunk 22. Once the tree 20 arrives at the desired location, the user can remove the backing layer 12, preferably using a tab 18, and place the tree 20 in the stand 30 leaving the water permeable hydrating layer 14 on the cut end of the tree trunk 22. The user can then fill the tree stand 30 with water 32 and the tree 20 will be able to draw the water 32 into the tree trunk 22 through the water permeable hydrating layer 14.

The membrane 10 according to the present invention advantageously both reduces or blocks exposure of the cut portion of the tree trunk to the air and continuously hydrates the tree. Experiments have shown that only keeping air out is not sufficient.

A Christmas tree that receives a second cut immediately prior to being put in a tree stand typically takes up at least five gallons of water in two to three weeks. Without a second cut, the water take up is often significantly less. Embodiments of the present invention were tested on Christmas trees that were allowed to sit for at least two days after being cut and before being placed in water. Trees on which the membrane were applied were able to achieve similar results to a tree that had received a second cut.

Figure 6:
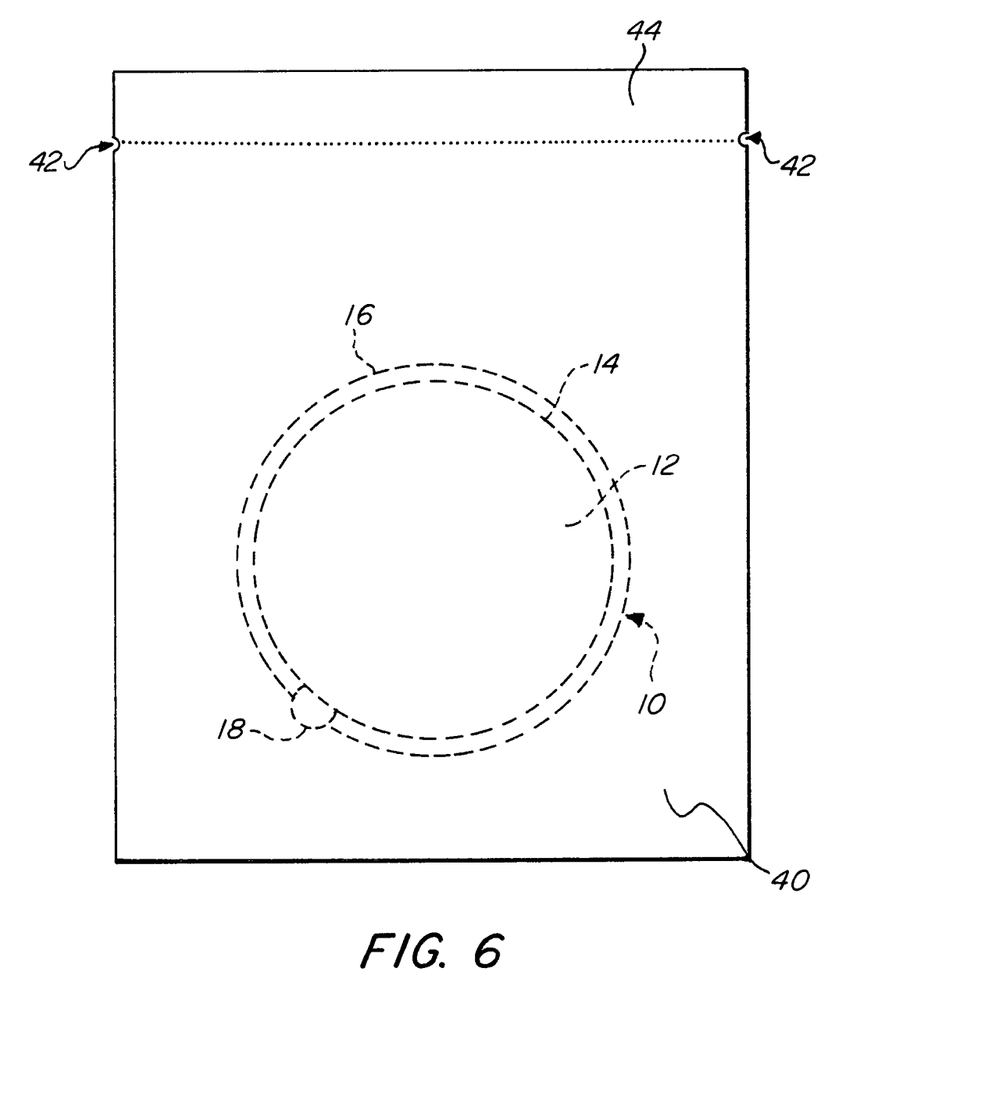
FIG. 6 illustrates a membrane according to an exemplary embodiment of the present invention within sealed packaging.
Figure 7:
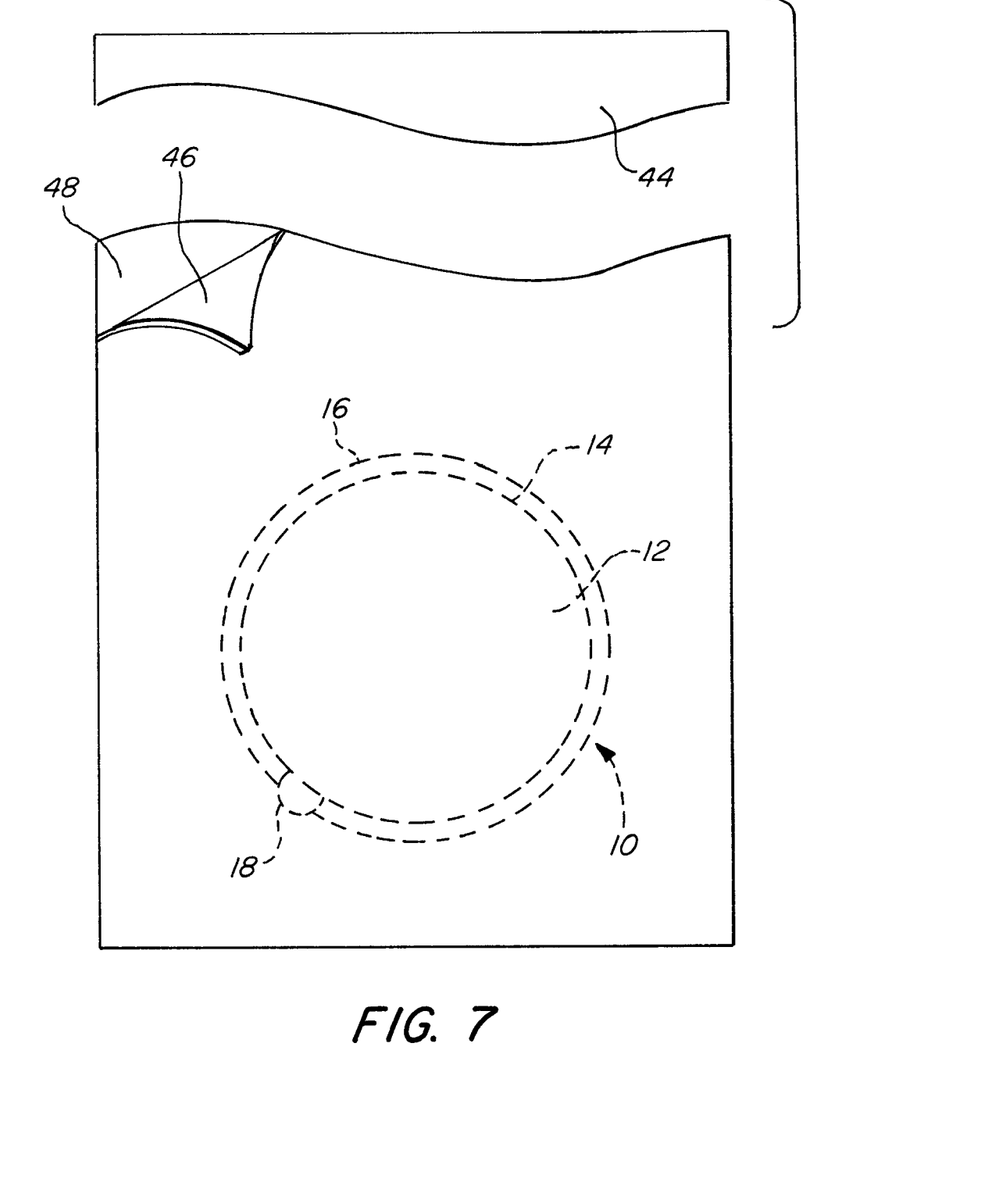
FIG. 7 illustrates a membrane according to an exemplary embodiment of the present invention within unsealed packaging.

FIGS. 6 and 7 illustrate an advantageous embodiment of packaging 40 for the membrane 10. The packaging 40 preferably forms an airtight seal around the membrane 10 to keep the membrane 10 from drying out. In some embodiments, the packaging 40 employs slots or notches 42 to facilitate tearing and removal of the packaging top 44 to access the membrane 10. In such embodiments, the user can remove the packaging top 44 using one or more slots 42 and remove the membrane 10 from the packaging 40 through an opening created by removal of the packaging top 44.

In some preferable embodiments, as illustrated in FIG. 7, the packaging may employ a separable first section 46 and second section 48 to help facilitate removal of the membrane 10. The user can peel the first section 46 away from the second section 48 after removal of the packaging top 44 using the one or more slots 42, leaving the membrane 10 laying upon the second section 48. The user can then simply pick up the membrane 10 and employ it on a tree 20 as desired.

Although the invention has been described with reference to a particular arrangement of parts, features and the like, these are not intended to exhaust all possible arrangements or features, and indeed many modifications and variations will be ascertainable to those of skill in the art.

What is claimed is:

1. A membrane for preventing a cut end of a tree trunk from sealing up after cutting, consisting of:
    a backing layer being impermeable to water;
    a hydrating layer having an inner surface and an outer surface, the inner surface attached directly to the backing layer; and
    a release layer removably attached directly to the outer surface of the hydrating layer;
    the hydrating layer comprising a foundation and a hydrogel adapted to, upon removable of said release layer, contact and adhere the hydrating layer to the cut end of the tree trunk;
    wherein the hydrogel is comprised of at least 90% water, is electron cured, and has adhesive properties which provide stickiness to hold the membrane to the cut end of the tree trunk;
    wherein, upon removal of said release layer, the membrane is flexible such that it is adapted to cover the cut end of the tree trunk and wrap onto sides of the tree trunk.

2. The membrane of claim 1 wherein the hydrogel is comprised of at least 95% water.

3. The membrane of claim 1 wherein the hydrogel comprises polyethylene oxide.

4. The membrane of claim 1 wherein the hydrating layer is cross-linked preventing the hydrogel from being absorbed by the tree.

5. The membrane of claim 1 wherein the foundation of the hydrating layer is a woven material resistant to tearing.

6. The membrane of claim 1 wherein the backing layer is impermeable to air.

7. The membrane of claim 1 wherein the hydrating layer is at least 30 Mil thick.

8. The membrane of claim 1 wherein the membrane hydrates and prevents the cut end of the tree trunk from sealing up for at least 72 hours.

9. The membrane of claim 1, wherein said backing layer has a first thickness and said hydrating layer has a second thickness greater than the first thickness.

10. A membrane for preventing a cut end of a tree trunk from sealing up after cutting, consisting of:
    a water-permeable hydrating layer comprising a foundation and a hydrogel adapted to contact and adhere the hydrating layer directly to the cut end of the tree trunk;
    a backing layer attached directly to an inner surface of the hydrating layer; and
    a release layer removably attached directly to an outer surface of the hydrating layer;
    wherein the hydrogel comprises at least 90% water and has adhesive properties which provide stickiness to hold the membrane to the cut end of the tree trunk;
    wherein, upon removal of said release layer, the membrane is flexible such that it is adapted to cover the cut end of the tree trunk and wrap onto sides of the tree trunk.

11. The membrane of claim 10 wherein the hydrogel comprises 95% water.

12. The membrane of claim 10 wherein the hydrating layer is at least 30 Mil thick.

13. The membrane of claim 10 wherein the hydrogel comprises polyethylene oxide.

14. The membrane of claim 13 wherein the hydrogel is electron cured.

15. The membrane of claim 10, wherein said backing layer is impermeable to water.

16. An airtight package comprising the membrane of claim 10 disposed therein.

17. The airtight package of claim 16, further comprising:
    one or more slots, a top portion, and a first section and second section;
    wherein the top portion is defined by the one or more slots; and
    wherein the membrane is sealed between the first section and the second section and can be removed from the airtight package through an opening created by removal of the top portion.

18. The membrane of claim 17 wherein the first section is separable from the second section to facilitate removal of the membrane.

19. A method of preserving a cut tree, comprising the steps of:
    cutting a tree down via a trunk of the tree;
    providing a membrane consisting of a water-permeable hydrating layer with a foundation and a hydrogel adapted to contact and adhere the hydrating layer directly to the cut end of the tree trunk; a backing layer attached directly to an inner surface of the hydrating layer; and a release layer removably attached directly to an outer surface of the hydrating layer; wherein the hydrogel comprises at least 90% water and has adhesive properties which provide stickiness to hold the membrane to the cut end of the tree trunk; and wherein, upon removal of said release layer, the membrane is flexible such that it is adapted to cover the cut end of the tree trunk and wrap onto sides of the tree trunk;
    removing said release layer from the membrane; and
    applying the membrane directly to a cut end of the trunk with the outer surface of the hydrating layer directly against the cut end of the tree trunk,
    wherein the membrane is circular having a distal edge about a circumference of the membrane, wherein the step of applying the membrane includes adhering a central portion of the outer surface of the hydrating layer of the membrane to the cut end of the trunk and adhering the distal edge to sides of the trunk.

20. The method according to claim 19, further comprising the steps of removing the membrane from the tree trunk and inserting the tree trunk into a tree stand.

21. The method according to claim 19, further comprising the steps of:
    inserting the tree trunk with the membrane applied thereto into a tree stand; and
    filling the tree stand with water.

* * * * *